W. ATKINS.
NUT LOCK.
APPLICATION FILED FEB. 18, 1909.
939,654.  Patented Nov. 9, 1909.
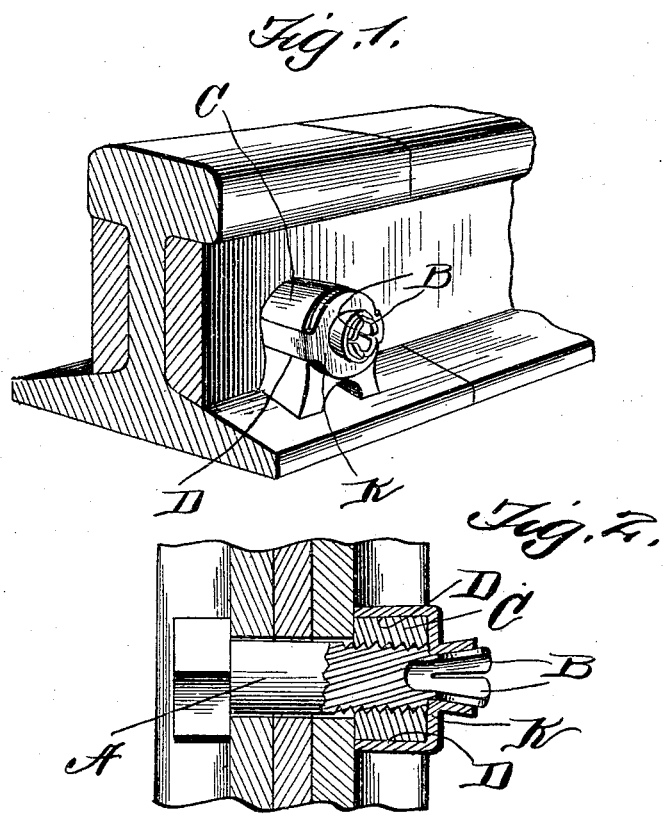
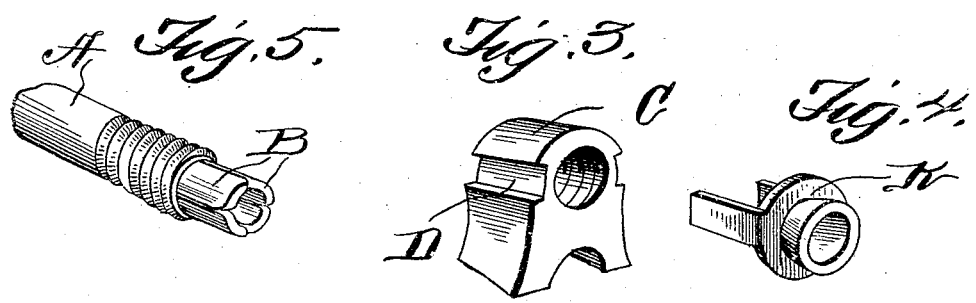
Witnesses
Inventor
William Atkins,
By Franklin N. Hough
Attorney

UNITED STATES PATENT OFFICE.

WILLIAM ATKINS, OF ST. JOHN, NEW BRUNSWICK, CANADA, ASSIGNOR OF TWO-THIRDS TO ALEXANDER W. MacRAE, OF ST. JOHN, NEW BRUNSWICK, CANADA.

NUT-LOCK.

939,654. Specification of Letters Patent. Patented Nov. 9, 1909.

Application filed February 18, 1909. Serial No. 478,652.

*To all whom it may concern:*

Be it known that I, WILLIAM ATKINS, a subject of the King of England, residing at St. John, New Brunswick, Canada, have invented certain new and useful Improvements in Nut-Locks; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in nut locks and comprises various details of construction, combinations and arrangements of parts which will be hereinafter fully described and then specifically defined in the appended claim.

My invention is illustrated in the accompanying drawings, in which:—

Figure 1 is a perspective view showing the nut lock as applied to a nut and bolt. Fig. 2 is a cross sectional view through the nut and bolt. Fig. 3 is a detail view of the nut. Fig. 4 is a detail view of the washer, and Fig. 5 is a detail perspective view of one end of the bolt.

Reference now being had to the details of the drawings by letter, A designates a bolt having one end contracted and hollow and said contracted portion terminates in a shoulder at the end of the threaded portion. Said hollow end is slitted longitudinally, forming the flexible fingers B which may be flexed by a blow with any suitable tool, such as a set or punch, for the purpose of flaring the fingers outward to engage means which will be hereinafter described. A nut C has a threaded bore for the reception of the threaded portion of the bolt and at points diametrically opposite in the outer face thereof are the horizontally disposed grooves D and said nut is provided with downwardly projecting portions forming legs which are preferably inclined and designed to rest on the flange of a rail. A washer, designated by letter K, is provided with an integral boss which slightly flares outwardly and of sufficient size to receive the contracted end of the bolt which is hollow and has its wall slitted forming series of flexible fingers, the outer walls of which are preferably convexed and said washer is provided with integral wings which extend at right angles thereto and are slightly concaved to conform to the shape of the grooves in the sides of the nut in which they are seated.

In applying the device to a bolt, the latter is passed through the threaded portion of the nut and the contracted part of the bolt extends into and preferably through the flaring boss which is integral with the washer, the shoulder at the end of the threaded portion of the bolt bearing against the inner face of the washer, after which, by giving a blow to the flexible fingers by means of any suitable tool, said fingers may be bent slightly outward against the flaring inner circumference of the integral boss, thus forming a secure means for holding the same upon the end of the bolt. The bolt may be removed by being unscrewed, the flexible fingers which are made preferably of malleable metal yielding as they are drawn through the integral boss or collar, thus leaving the bolt in readiness for use again and without any injury.

What I claim to be new is:—

A nut lock comprising, in combination with a bolt having a recess in one end thereof, the walls of which are split forming flexible fingers with their outer ends convexed, a nut adapted to fit the threaded portion of the bolt and having legs which are inclined and adapted to conform to the inclination of the flange of the rail upon which they rest, the opposite upright sides of the nut having transversely disposed grooves, a washer having a hollow boss which flares outwardly and through which said fingers are adapted to project, said fingers adapted to be outwardly flexed against the inner flaring face of said boss, and wings projecting from said washer at points diametrically opposite and at right angles to the face of the washer and engaging said grooves in the nut, as shown and described.

In testimony whereof I hereunto affix my signature in the presence of two witnesses.

WILLIAM ATKINS.

Witnesses:
OMAR E. MUELLER,
ALMA DOYLE.